April 25, 1944. P. PARKE 2,347,500
RAILWAY CAR TRUCK
Filed May 25, 1940 4 Sheets-Sheet 1
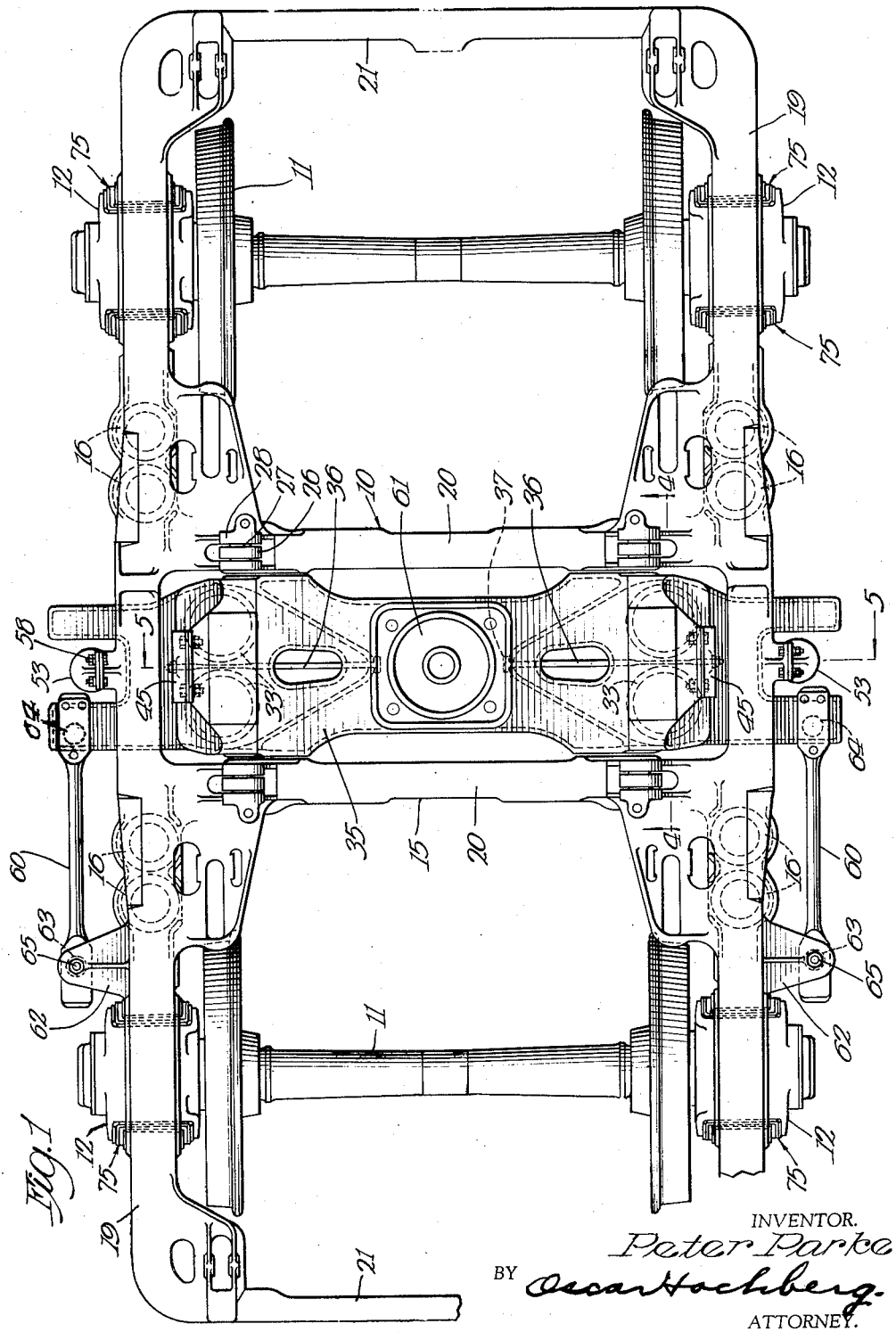
INVENTOR.
Peter Parke
BY Oscar Hochberg
ATTORNEY.

April 25, 1944.　　　　P. PARKE　　　　2,347,500
RAILWAY CAR TRUCK
Filed May 25, 1940　　　　4 Sheets-Sheet 2
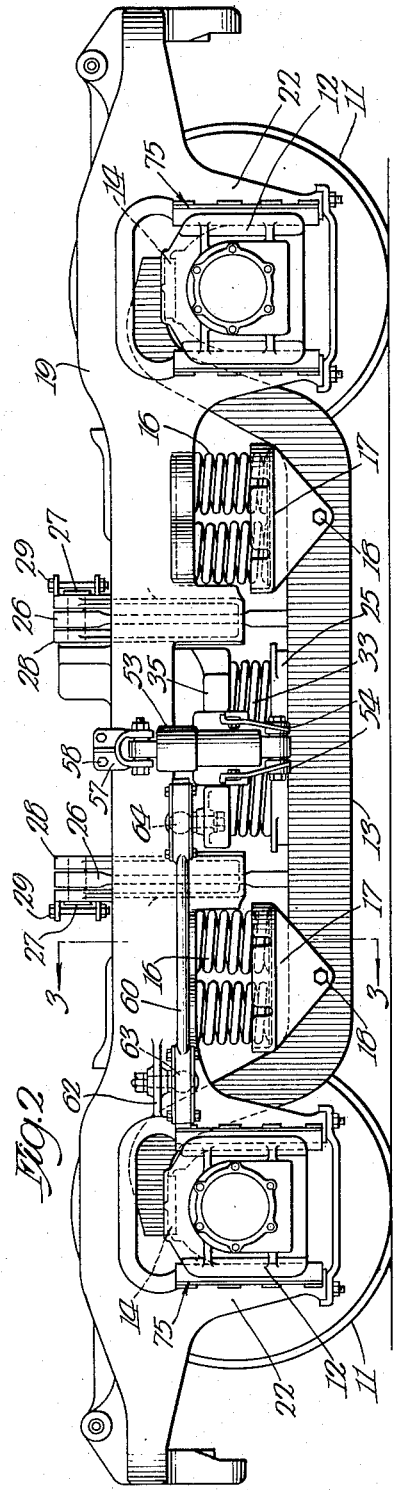
INVENTOR.
Peter Parke
BY Oscar Hochberg
ATTORNEY.

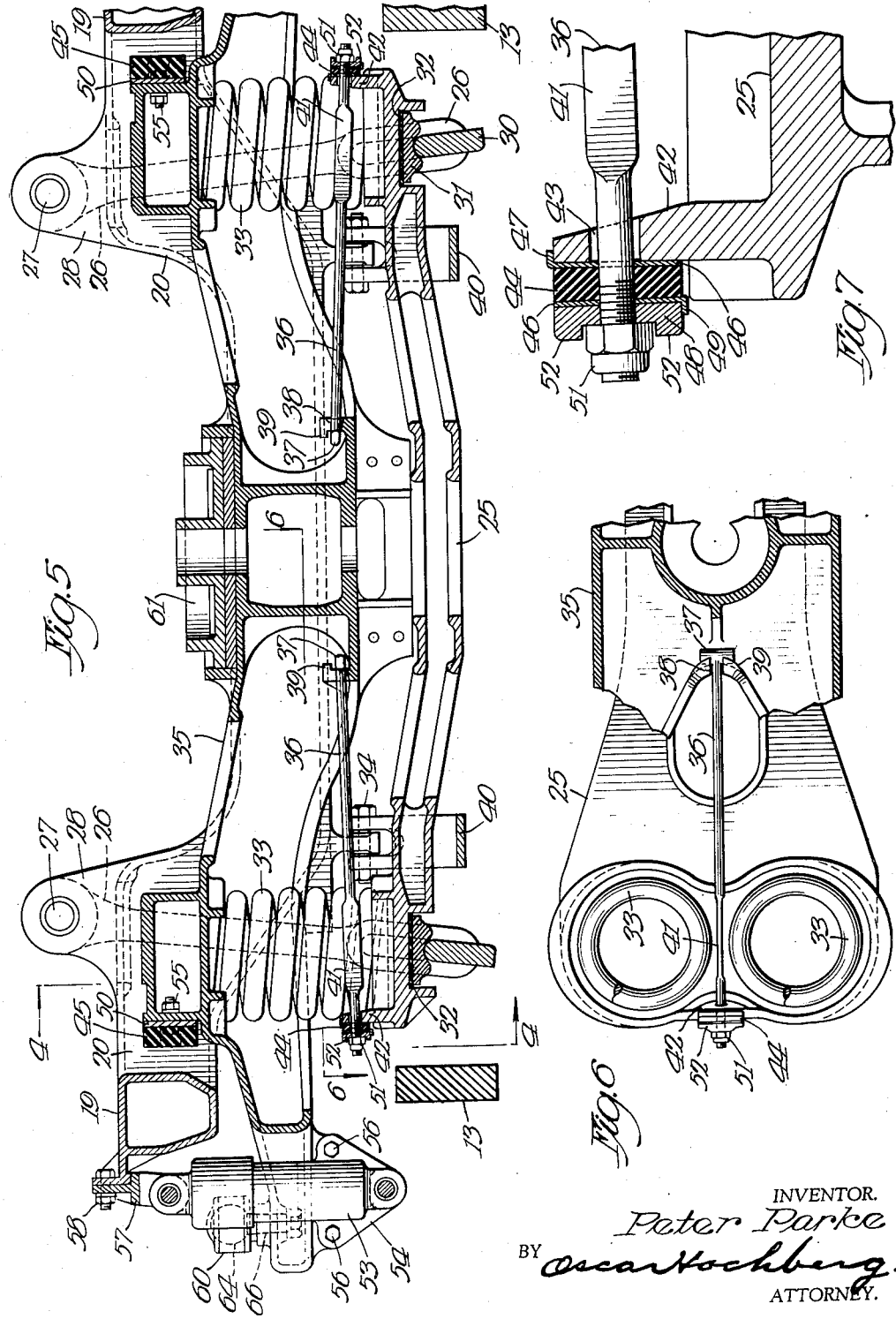

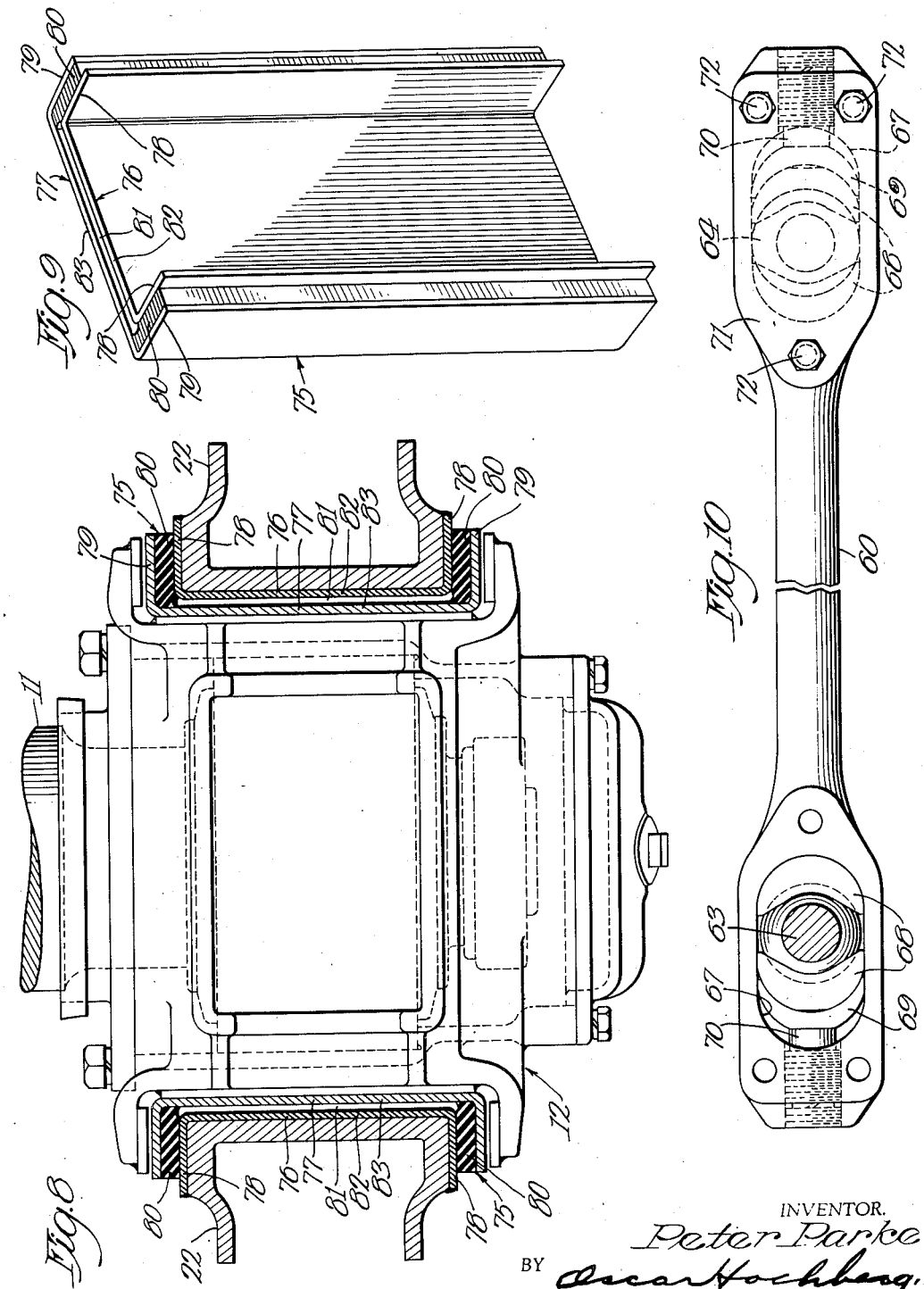

Patented Apr. 25, 1944

2,347,500

UNITED STATES PATENT OFFICE 2,347,500

RAILWAY CAR TRUCK

Peter Parke, Chicago, Ill., assignor to The Pullman Company, Chicago, Ill., a corporation of Illinois Application May 25, 1940, Serial No. 337,162

19 Claims. (Cl. 105—190)

This invention relates to railway car trucks generally and has particular reference to the bolster suspension arrangement involving the use of helical springs with means for controlling the action of the springs and having means for maintaining a predetermined relation of the bolster with respect to the truck frame.

An important object of the invention is the provision of a car truck utilizing helical bolster-supporting springs for reducing the weight of the truck and having shock-absorbing means for modifying the action of the bolster spring to provide an easy riding truck.

A particular object of the invention is the provision of a truck having helical bolster-supporting springs swingingly supported with respect to the truck frame on a laterally movable spring plank and having a connection between the spring plank and bolster for insuring stabilization of the helical springs.

The invention further contemplates the provision of a bolster suspension arrangement for car trucks involving bolster draft means for maintaining the bolster in predetermined, angular relation with respect to the truck frame in combination with spring plank and bolster tie members controlling relative lateral movement between the spring plank and bolster and shock-absorbing means controlling relative vertical displacement of the bolster with respect to the truck frame.

The foregoing and other objects are attained by the arrangement illustrated in the accompanying drawings in which—

Fig. 1 is a general plan view of a railway passenger car truck incorporating a bolster suspension arrangement in accordance with this invention;

Fig. 2 is a side elevational view of the car truck disclosing the relative relation of the helical springs between the axles and truck frame with respect to the helical springs supporting the bolster and disclosing the bolster shock-absorbing member and the bolster draft device;

Fig. 3 is a sectional view taken on the line 3—3 of Fig. 2 showing the disposition of the truck frame supporting springs and the bracket for attachment of the bolster draft member;

Fig. 4 is a sectional view taken on the line 4—4 of Fig. 5 through the bolster-supporting swing hanger arrangement and showing the helical bolster springs;

Fig. 5 is a transverse, sectional view taken on the line 5—5 of Fig. 1 through the center of the bolster showing the helical bolster supporting springs with the laterally disposed stabilizing connections between the bolster and spring plank and the shock absorbers disposed between the bolster and truck frame and showing the location of the bolster draft device in the plane of the truck center plate;

Fig. 6 is a sectional plan view taken on the line 6—6 of Fig. 5 showing one of the laterally disposed tie rod connections between the bolster and spring plank;

Fig. 7 is an enlarged, fragmentary, detailed sectional view of the connection of the tie rod member to the spring plank;

Fig. 8 is a plan sectional view through the truck pedestal showing the cushioning arrangement between the pedestal and journal box;

Fig. 9 is a perspective view of the journal box cushion; and

Fig. 10 is an enlarged detail view of the bolster draft member.

In the drawings, 10 represents a railway car truck having wheel and axle assemblies 11 carrying journal boxes 12 from which equalizers 13 are supported on rubber cushioning pads 14. The truck frame 15, having pedestals 22 straddling the respective journal boxes, is supported from the equalizers by means of helical springs 16 carried in spring seats 17 secured to the equalizers, as at 18, and disposed in groups of two adjacent the respective journal boxes, wherefore the truck frame is resiliently supported from the journal boxes. The truck frame comprises side frames 19 including pedestals 22 and connected by spaced transom members 20 and end sills 21.

A spring plank 25 is swingingly supported from the transom members 20 for relative lateral motion with respect to the truck frame by means of swing hangers 26. The hangers 26 are pivotally suspended from the transom members by means of headed pins 27 passing through brackets 28 on the transoms and through openings provided therefor in the swing hangers and which are secured in place by bolts 29. The swing hangers are disposed in pairs at opposite sides of the truck frame in position to support the spring plank at the four corners thereof and are connected at their lower ends beneath the spring plank by keys 30 supporting the spring plank. The spring plank, by reason of its rigidity between the keys 30, maintains the swing hangers in predetermined, angular relation with respect to the truck frame. Seat members 31 are disposed on the keys 30 beneath the spring plank, and rubber cushioning pads 32 are disposed on these seat members in supporting relation to the spring plank and prevent transmission of vibration and sound therethrough. Safety straps 40 are disposed beneath the spring plank and are supported at opposite ends from the respective transoms 20 at opposite sides of the spring plank by means of bolts 34 connecting them therewith. Helical springs 33 are carried by the spring plank and disposed in groups of two at the respectively opposite ends thereof in supporting relation to the bolster 35. To insure coincidental movement of the bolster with the spring plank, laterally disposed tie rods 36 extend from adjacent the center of the bolster, where they are connected therewith, toward opposite sides of the truck where they are connected to respectively opposite ends of the spring plank.

The connections 36 comprise T-bolts or rod members each having a T-shaped head 37 interlocked with a slotted bracket 38 substantially at the center of the bolster. A horizontal flange 39 on the connection bracket 38 and overlying the T-head of the rod 36, prevents rotation thereof and insures retention of the rod member in the slot during operation. The rod 36, as best shown in Figs. 4 and 5, is connected, resiliently, to the spring plank 25 by means of an upstanding bracket flange 42 cast integral with the spring plank and through which the rod penetrates as at 43. The connection of the rod to the spring plank is cushioned by means of a rubber pad 44 vulcanized between the opposed faces of backing plates 46. The plates 46 at opposite sides of the pad 44 are each extended beyond the area of the rubber pad at diametrically opposite edges thereof and folded, respectively, over the edge of the upstanding bracket flange 42 on the spring plank, as at 47, and over the edge of a clamping plate 48, as at 49, to prevent relative rotation between the pad and the flange 42 and between the pad and the clamping plate 48. The tie rods 36 are disposed in tension between their respective connections at the center of the bolster and the ends of the spring planks; and nuts 51, threaded onto the ends of the tie rods, securely hold them in connection with the spring plank and afford means of adjustment. Spaced flanges 52 on the clamping plates 48 engage opposite sides of the hexagonal nuts 51 to prevent relative rotation thereof. By the use of the tie rods 36, the helical bolster-supporting springs 33 are relieved of all unnecessary stresses due to movements other than direct vertical displacement of the bolster with respect to the spring plank. Relative lateral motion between the bolster and spring plank would induce canting of the bolster springs—consequently setting up forces tending to upset the springs; therefore, if the springs 33, alone, were utilized to transmit lateral swinging motion between the bolster and spring plank, a lag in the follow-up therebetween would be created due to the tilting of the springs, and a reaction would result as the springs righted themselves. By tying the bolster and spring plank together for coincidental lateral motion, the tie rods 36 serve to stabilize the helical bolster springs 33, which are thereby permitted to function only in the accommodation of the relative vertical deflection necessary to cushion the load applied by the bolster, and may be so designed initially without consideration of any tendency of the springs to tilt and the ensuing reaction.

The helical springs 33 supporting the bolster 35 are softer in their action than the usual leaf springs heretofore used, and, in addition to providing light weight in the assembly, afford an easier riding truck. In the flexing of multiple-leaf springs, as heretofore used, friction occurs between the leaves which hinders free flexing of the springs and sets up a load which must first be overcome before the spring can flex to cushion the various vertical oscillations to which a car truck bolster is subjected; but in the flexing of helical springs, there is no friction to retard free flexing of the springs under load, and, therefore, this type of spring is more responsive to variations in the load applied.

In order to modify the action of the helical springs by controlling the rebound thereof after deflection, hydraulic shock absorber members 53 are disposed between the respective ends of the bolster and the side frames 19. The shock absorbers 53 are disposed for action vertically and cushion only the recoil movement of the helical springs 33 and offer no resistance to the normal downward deflection thereof. The shock absorbers are connected to the bolster ends by means of depending brackets 54 bolted to the bolster as at 56. Brackets 57 are bolted to the side frames 19, as at 58, in order to provide a point of connection with the truck frame. It will be noted that the shock absorber is pivotally connected, both top and bottom, to the bracket 57 on the truck frame and the bracket 54 on the bolster, respectively, whereby the shock absorber is free to assume an acute angle with respect to the bolster and truck frame in response to lateral displacement of the bolster; and, therefore, no resistance is offered thereby to such movement of the bolster, whereby the shock absorber is free to function properly to control the recoil of the springs 33 without restraint due to misalignment either in the pivotal connections to the truck frame and bolster or in the relatively movable parts of the shock absorber itself. The extreme, lateral movements of the bolster are cushioned at each side of the truck by means of a rubber pad 45 vulcanized to backing plate 50 bolted to the bolster, as at 55, and disposed at opposite ends thereof in position to engage the inner side of the respective side frames 19 as the bolster moves laterally.

Bolster draft devices 60 having universal connection with the bolster and truck frame insure maintenance of the predetermined angular relation of the bolster with respect to the truck frame and prevent misalignment or canting of the bolster with respect to the transom members 20 between which the bolster is mounted. It will be noted, as best shown in Fig. 5, that the draft devices 60 are disposed substantially in a plane on a level with the center plate 61 on the bolster, whereby forces of draft and buffing due to starting and braking efforts and tending to cant the bolster are resisted most effectively directly at their source. Bolster chafing plates may be used between the bolster and respective transom members to confine the movements of the bolster within certain limits; but, as best shown in Figs. 1 and 2, the draft members 60 are preferably used in this construction, whereby the bolster is out of contact with the transom members and therefore free of any restraining influence due to friction therebetween. The draft devices 60 comprise strut members at opposite sides of the truck extending between extensions on the respective ends of the bolster and bracket members 62 on the truck frame. Spherical bracket members 63 and 64 are removably secured to the truck frame bracket members and bolster extensions, respectively, by means of tapered, bolted connections 65 and 66. The struts 60 extend between the brackets 63 and 64 at opposite sides of the truck normally substantially parallel to the side frames 19 and are each provided with pockets 67 at opposite ends, as best illustrated in Fig. 10, which are adapted to fit over the respective brackets 63 and 64. Bearing blocks 68, which may be of suitable bearing material, are disposed at opposite sides of the spherical members 63 and 64, in engagement therewith, within the pockets; and a follower block or backing plate 69 engages one of the bearing blocks in each pocket to urge the bearings into engagement with the spherical members under the influence of adjustment member 70 threaded into opposite ends of the struts 60 and entering the respective pockets 67 to bear against the follower plates 69 and affording adjustment of the bearing engagement between the blocks 68 and the spherical bracket members 63 and 64. Cover plates 71, bolted to the strut member 60, as at 72, seal the respective pockets and maintain the parts therein in their proper, assembled relation while permitting universal movement of the struts with respect to their attaching brackets.

The mounting of the journal box 12 within the pedestals 22 is cushioned by means of a pedestal liner 75 utilizing rubber in shear between the pedestals and journal boxes so placed as to be readily flexed in the absorption of shocks between the boxes and pedestals and to cushion all relative movement therebetween. The pedestal liners 75 each comprise a channel-shaped, pedestal-engaging mounting plate 76 and a channel-shaped, journal-box-engaging bearing plate 77 in spaced, substantially concentric relation and having spaced flanges 78 and 79, respectively. Between the respective opposing flanges 78 and 79 at opposite sides of each pedestal liner, cushioning pads 80 of live rubber are bonded to the opposing surfaces of the respective flanges by vulcanization—leaving the space 81 between the opposing webs 82 and 83 of the respective channel plates 76 and 77 to provide for relative movement therebetween, at which time the rubber pads 80 function in shear to cushion relative movement between the webs 82 and 83 but having sufficient capacity to resist the ordinary operating forces involved in pulling the truck along. By the disposition of the rubber only between the side flanges of the spaced pedestal liner and the provision of the open space between the adjacent webs of the plates, a flexible pedestal liner is afforded in which the rubber thus placed in shear and not under compression may readily flex in response to relative movement between the journal box and pedestals. This ready flexing of the pedestal liners due to the use of rubber in shear will eliminate pounding between the journal boxes and pedestals caused by movement of the boxes relative to the truck frame and will prevent the transmission of vibration and sound.

From the foregoing, it will be seen that there has been provided a railway passenger car truck of light weight utilizing helical bolster springs to accomplish this purpose and to afford an easy riding truck due to the greater resiliency of this type of spring and having shock-absorbing mechanism for modifying the recoil action of such springs with stabilizing means between the spring plank and bolster relieving the bolster springs of unnecessary stresses and having bolster draft devices controlling the angular relation of the bolster with respect to the truck frame.

What is claimed is:

1. A car truck having journal boxes and including a truck frame, equalizers on the journal boxes, helical springs on the equalizers supporting the truck frame, a bolster mounted for movement in the truck frame, helical springs hung by swing hangers from the frame at opposite sides thereof in supporting relation to said bolster and adapted to have lateral motion relative to the frame, a spring plank continuous between helical springs at opposite sides of the truck and maintaining said swing hangers in predetermined angular relation, tie rods connecting the spring plank and bolster for coincidental lateral motion, bolster stabilizer rods having universal connections to the bolster and truck frame at opposite sides thereof for maintaining the bolster in predetermined relation to the frame, and fluid-actuated shock absorbers having connections with the bolster and truck frame adjacent opposite sides thereof and modifying the action of said second-named helical springs.

2. In a railway truck, a load-carrying bolster, a spring near each side of the truck supporting said bolster, structure carrying said springs and including a truck frame and swing hangers suspended from said frame and providing for lateral movement of said bolster relative to said frame, a spring plank continuous between the springs at opposite sides of the truck and maintaining said swing hangers in predetermined angular relation, said frame having side members outboard of the springs, said bolster having portions outboard of the springs, a shock absorbed positioned at each side of the truck, means spaced laterally from the center of the truck at least as far as the frame side member and connecting the terminal elements of each shock absorber respectively to the corresponding bolster portion and to said structure so as to accommodate lateral movement of the bolster relative to the frame and to control the action of said springs, and tie rods connecting the spring plank and bolster for coincidental lateral motion.

3. A car truck having journal boxes and including a truck frame, helical springs between the frame and journal boxes, a bolster mounted for movement in the truck frame, helical springs hung by swing hangers from the frame at opposite sides thereof in supporting relation to said bolster and adapted to have lateral motion relative to the frame, a spring plank continuous between helical springs at opposite sides of the truck and maintaining said swing hangers in predetermined angular relation, tie rods connecting the spring plank and bolster for coincidental lateral motion comprising oppositely disposed tension members having pivotal connection with the bolster adjacent the center thereof and with the spring plank at opposite ends thereof at least one of such connections for each tension member being adapted to accommodate lost motion resulting from rise and fall of the bolster relative to the spring plank, and bolster stabilizer rods having universal connections to the bolster and truck frame at opposite sides thereof for maintaining the bolster in predetermined relation to the frame.

4. A car truck having journal boxes and including a truck frame, springs between the frame and journal boxes, a member mounted for movement in the truck frame, springs hung by swing hangers from the frame at opposite sides thereof in supporting relation to said bolster member and adapted to have lateral motion relative to the frame, a spring plank member continuous between springs at opposite sides of the truck and maintaining said swing hangers in predetermined angular relation, and tie rods connecting the spring plank and bolster for coincidental lateral motion, and comprising oppositely disposed elements each extending between said members and having a lost-motion connection with at least one of them for coincidental lateral motion of the members and rise and fall of the bolster member relative to the spring plank member.

5. A car truck having journal boxes and including a truck frame, springs between the frame and journal boxes, a bolster mounted for movement in the truck frame, springs hung by swing hangers from the frame at opposite sides thereof in supporting relation to said boltster and adapted to have lateral motion relative to the frame, a spring plank continuous between springs at opposite sides of the truck and maintaining said swing hangers in predetermined angular relation, and tie rods connecting the spring plank and bolster for coincidental lateral motion adapted to stabilize said second-named springs and comprising laterally extending and oppositely disposed tension members having cushioned connection with opposite ends of the spring plank including rubber pads between the respective members and the spring plank and pivotal connection with the bolster adjacent the center thereof.

6. A car truck having journal boxes and including a truck frame, springs between the frame and journal boxes, a bolster mounted for movement in the truck frame, a center plate on the bolster, springs hung by swing hangers from the frame at opposite sides thereof in supporting relation to said bolster and adapted to have lateral motion relative to the frame, a spring plank continuous between springs at opposite sides of the track and maintaining said swing hangers in predetermined angular relation, tie rods connecting the spring plank and bolster for coincidental lateral motion adapted to stabilize said second-named springs and comprising laterally extending and oppositely disposed tension members having cushioned connection with opposite ends of the spring plank and pivotal connection with the bolster adjacent the center thereof, and bolster stabilizer rods connecting the bolster and truck frame at opposite sides thereof for maintaining the bolster in predetermined relation to the frame and comprising longitudinally extending struts having universal connection with the frame and bolster and disposed in a plane substantially on a level with said center plate.

7. A car truck having journal boxes and including a truck frame, springs between the frame and journal boxes, a bolster mounted for movement in the truck frame, springs hung by swing hangers from the frame at opposite sides thereof in supporting relation to said bolster and adapted to have lateral motion relative to the frame, a spring plank continuous between springs at opposite sides of the truck and maintaining said swing hangers in predetermined angular relation, tie rods connecting the spring plank and bolster for coincidental lateral motion adapted to stabilize said second-named springs and comprising laterally extending and oppositedly disposed tension members having cushioned connection with opposite ends of the spring plank and pivotal connection with the bolster adjacent the center thereof, and vertically acting shock absorbers having upper and lower pivotal connections with the truck frame and bolster respectively disposed at opposite ends of the bolster adapted to compensate for relative lateral motion of the bolster, said shock absorbers serving to modify the action of said second-named springs.

8. A car truck having journal boxes and including a truck frame, springs between the frame and journal boxes, a bolster mounted for movement in the truck frame, a center plate on the bolster, springs hung by swing hangers from the frame at opposite sides thereof in supporting relation to said bolster and adapted to have lateral motion relative to the frame, a spring plank continuous between springs at opposite sides of the truck and maintaining said swing hangers in predetermined angular relation, tie rods connecting the spring plank and bolster for coincidental lateral motion adapted to stabilize said second-named springs and comprising laterally extending and oppositely disposed tension members having cushioned connection with opposite ends of the spring plank and pivotal connection with the bolster adjacent the center thereof, bolster stabilizer rods connecting the bolster and truck frame at opposite sides thereof for maintaining the bolster in predetermined relation to the frame and comprising longitudinally extending struts having universal connection with the frame and bolster and disposed in a plane substantially on a level with said center plate, and vertically acting shock absorbers having upper and lower pivotal connections with the truck frame and bolster respectively disposed at opposite ends of the bolster adapted to compensate for relative lateral motion of the bolster, said shock absorbers serving to modify the action of said second-named springs.

9. In a railway truck, a load-carrying bolster, a spring near each side of the truck supporting said bolster, structure carrying said springs and including a truck frame and swing hangers suspended from said frame and providing for lateral movement of said bolster relative to said frame, a spring plank continuous between the springs at opposite sides of the truck and maintaining said swing hangers in predetermined angular relation, a vertically actuated shock absorber positioned at each side of the truck, means spaced laterally from the center of the truck at least as far as the frame side member and connecting the terminal elements of each shock absorber respectively to the corresponding bolster portion and to said structure so as to accommodate lateral movement of the bolster relative to the frame and to control the action of said springs, said shock absorbers serving to modify the action of said springs, and bolster stabilizer rods connecting the bolster and truck frame at opposite sides thereof for maintaining the bolster in predetermined relation to the frame and comprising longitudinally extending struts having universal connection with the frame and bolster and disposed in a plane substantially on a level with said center plate.

10. A car truck including a truck frame, a bolster member mounted for movement in the truck frame, springs hung by swing hangers from the frame at opposite sides thereof in supporting relation to the bolster member and adapted to have lateral motion relative to the frame, a spring plank member continuous between springs at opposite sides of the truck maintaining said hangers in predetermined angular tie rod means connecting the members, and spaced flat rubber blocks disposed between the tie rod means and at least one of the members and adapted to be alternatively compressed in substantially the direction of stress in the tie rod means when the bolster member moves laterally with respect to the spring plank member.

11. In a railway truck, a load-carrying bolster, a spring near each side of the truck supporting said bolster, structure carrying said springs and including a truck frame and swing hangers suspended from said frame and providing for lateral movement of said bolster relative to said frame, a spring plank continuous between the springs at opposite sides of the truck and maintaining said swing hangers in predetermined angular relation, a vertically actuated shock absorber positioned at each side of the truck, and means spaced laterally from the center of the truck at least as far as the frame side member and connecting the terminal elements of each shock absorber respectively to the corresponding bolster portion and to said structure so as to accommodate lateral movement of the bolster relative to the frame and to control the action of said springs, said shock absorbers serving to modify the action of said springs.

12. A car truck having journal boxes and including a truck frame, helical springs between the frame and journal boxes, a bolster member mounted for movement in the truck frame, helical springs hung by swing hangers from the frame at opposite sides thereof in supporting relation to said bolster member and adapted to have lateral motion relative to the frame, a spring plank member continuous between helical springs at opposite sides of the truck and maintaining said swing hangers in predetermined angular relation, tie rod means connecting the members, and spaced flat rubber blocks disposed between the tie rod means and at least one of the members and adapted to be alternatively compressed in substantially the direction of stress in the tie rod means when the bolster member moves laterally with respect to the spring plank member.

13. A car truck having journal boxes and including a truck frame, helical springs between the frame and journal boxes, a bolster mounted for movement in the truck frame, helical springs hung by swing hangers from the frame at opposite sides thereof in supporting relation to said bolster and adapted to have lateral motion relative to the frame, a spring plank continuous between helical springs at opposite sides of the truck and maintaining said swing hangers in predetermined angular relation, and a laterally disposed tie rod connection between the spring plank and bolster for coincidental lateral motion thereof adapted to stabilize said second-named springs and comprising a rod including a T-head having interlocking engagement with the bolster and adapted for pivotal movement relative thereto and having a cushioned connection with the spring plank including a rubber pad, a clamping plate, and a securing member having threaded engagement with said rod, said rod penetrating the spring plank, pad, and clamping plate, and said pad being clamped between said plate and spring plank by said securing member.

14. A car truck having journal boxes and including a truck frame, helical springs between the frame and journal boxes, a bolster mounted for movement in the truck frame, helical springs hung by swing hangers from the frame at opposite sides thereof in supporting relation to said bolster and adapted to have lateral motion relative to the frame, a spring plank continuous between helical springs at opposite sides of the truck and maintaining said swing hangers in predetermined angular relation, a laterally disposed tie rod connection between the spring plank and bolster for coincidental lateral motion thereof adapted to stabilize said second-named springs and comprising a rod including a T-head having interlocking engagement with the bolster and adapted for pivotal movement relative thereto and having a cushioned connection with the spring plank including a rubber pad, a clamping plate, and a securing member having threaded engagement with said rod, said rod penetrating the spring plank, pad, and clamping plate, and said pad being clamped between said plate and spring plank by said securing member and having the respective backing plates extended beyond an edge thereof and interlocking with the spring plank and clamping plate respectively to prevent relative rotation therebetween, and said clamping plate interlocking with the securing member to prevent relative rotation therebetween.

15. A car truck having journal boxes and including a truck frame, helical springs between the frame and journal boxes, a bolster member mounted for movement in the truck frame, helical springs hung by swing hangers from the frame at opposite sides thereof in supporting relation to said bolster member and adapted to have lateral motion relative to the frame, a spring plank member continuous between helical springs at opposite sides of the truck and maintaining said swing hangers in predetermined angular relation, laterally disposed tie rod means connecting the spring plank and bolster members for coincidental lateral motion thereof adapted to stabilize said second-named springs and having pivotal connection with the bolster and spring plank members respectively, and spaced flat rubber blocks disposed between the tie rod means and at least one of the members and adapted to be alternatively compressed in substantially the direction of stress in the tie rod means when the bolster member moves laterally with respect to the spring plank member, one of said pivotal connections comprising a cushioned assembly including a rubber pad adapted to flex between the associated parts in response to relative movement therebetween.

16. A car truck having journal boxes and a truck frame supported from the journal boxes, a bolster mounted for movement relative to the truck frame, swing hangers suspended from the truck frame at opposite sides thereof adapted to have lateral swing motion relative thereto, a spring plank extending between and supported by said swing hangers, cushioning means between said spring plank and the bolster, and a laterally disposed connection between the spring plank and bolster adapted to provide for coincidental lateral motion thereof in response to the lateral swing motion of said swing hangers, said connection comprising a tie rod having interlocking engagement with the bolster adapted for pivotal movement relative thereto and a cushioned connection with the spring plank including a resilient unit, a clamping plate and a fastening, said tie rod penetrating a portion of the sprink plank, the resilient unit and the clamping plate, and said resilient unit being clamped between said plate and the spring plank by said fastening.

17. A car truck having journal boxes and a truck frame supported from the journal boxes, a bolster member mounted for movement relative to the truck frame, swing hangers suspended from the truck frame at opposite sides thereof adapted to have lateral swing motion relative thereto, a spring plank member extending between and supported by said swing hangers, cushioning means between said spring plank member and the bolster member, and a laterally disposed connection between the spring plank member and bolster member adapted to provide for coincidental lateral motion thereof in response to the lateral swing motion of said swing hangers, said connection comprising a tie rod having pivotal engagement with one of said members and a cushioned connection with the other of said members including a resilient unit, a clamping plate and a fastening, said tie rod penetrating a portion of the last-named member, the resilient unit and the clamping plate, and said resilient unit being clamped between said plate and the last-named member by said fastening.

18. In a railway truck, a load-carrying bolster, a spring near each side of the truck supporting said bolster, structure carrying said springs and including a truck frame and swing hangers suspended from said frame and providing for lateral movement of said bolster relative to said frame, said frame having side members outboard of the springs, said bolster having portions outboard of the springs, a shock absorber positioned at each side of the truck, and means spaced laterally from the center of the truck at least as far as the frame side member and connecting the terminal elements of each shock absorber respectively to the corresponding bolster portion and to said structure so as to accommodate lateral movement of the bolster relative to the frame and to control the action of said springs.

19. In a railway truck, a load-carrying bolster, springs for supporting said bolster, structure carrying said springs and including a truck frame and swing hangers suspended from said frame and providing for lateral movement of said bolster relative to said frame, the springs for said bolster being disposed inwardly of the sides of said frame, said frame having side members outward of the springs, said bolster having portions outboard of the springs and below said frame, a vertically disposed shock absorber positioned at each side of the truck outwardly of the said springs, and means spaced laterally from the center of the truck at least as far as the frame side member and connecting the terminal elements of each shock absorber respectively to the corresponding bolster portion and to said structure so as to accommodate lateral movement of the bolster relative to the frame and to control the action of said springs.

PETER PARKE.

CERTIFICATE OF CORRECTION.

Patent No. 2,347,500. April 25, 1944.

PETER PARKE.

It is hereby certified that error appears in the printed specification of the above numbered patent requiring correction as follows: Page 3, second column, line 36, claim 2, for "absorbed" read --absorber--; line 72, claim 4, before "member" insert --bolster--; page 4, second column, line 72, claim 10, after "angular" insert the words and comma --relation,--; page 5, second column, line 44, claim 15, beginning with the comma and words ", one of said" strike out all to and including "therebetween" in line 48; line 67, claim 16, for "sprink" read --spring--; and that the said Letters Patent should be read with this correction therein that the same may conform to the record of the case in the Patent Office.

Signed and sealed this 20th day of June, A. D. 1944.

(Seal)

Leslie Frazer
Acting Commissioner of Patents.